United States Patent [19]

Frear et al.

[11] Patent Number: 4,468,078

[45] Date of Patent: Aug. 28, 1984

[54] FORWARDLY REMOVABLE COUPLING RING FOR AN ELECTRICAL CONNECTOR

[75] Inventors: David L. Frear, Afton; Stephen Punako; David W. MacAvoy, both of Bainbridge; David O. Gallusser, Oneonta, all of N.Y.

[73] Assignee: The Bendix Corporation, Southfield, Mich.

[21] Appl. No.: 402,527

[22] Filed: Jul. 28, 1982

[51] Int. Cl.³ .............................................. H01R 13/20
[52] U.S. Cl. .................................................... 339/90 R
[58] Field of Search .......................... 339/89 R, 90 R; 285/360, 361, 401, 402, 376, 396

[56] References Cited

U.S. PATENT DOCUMENTS

| | | | |
|---|---|---|---|
| 3,221,292 | 10/1961 | Swanson et al. | 339/217 |
| 3,271,726 | 9/1966 | Pfendler | 339/49 R |
| 3,316,524 | 4/1967 | Pastor | 339/89 R |
| 3,328,743 | 6/1967 | Acord | 339/90 R |
| 3,711,815 | 1/1973 | Pierce et al. | 339/90 R |
| 3,745,511 | 7/1973 | Fussell | 339/90 R |
| 3,786,396 | 1/1974 | Kemmer et al. | 339/89 R |
| 3,840,839 | 10/1974 | Smaczny et al. | 339/90 R |
| 4,185,856 | 1/1980 | McCaskill | 285/376 |
| 4,390,222 | 6/1983 | Carter | 339/90 R |
| 4,415,213 | 11/1983 | Punako et al. | 339/90 R |

FOREIGN PATENT DOCUMENTS 1079927 12/1954 France ............................. 285/361

Primary Examiner—Joseph H. McGlynn
Assistant Examiner—Thomas M. Kline
Attorney, Agent, or Firm—R. J. Eifler; C. D. Lacina

[57] ABSTRACT

The invention is an electrical connector that has a forwardly removable coupling ring (30). The coupling ring (30) is characterized by annular members (31, 32) that are connected together by one or more removable fasteners (50, 51) and held in place in front of the housing flange (11) by a snap ring (40) located in a groove (12) in the housing (10).

10 Claims, 7 Drawing Figures

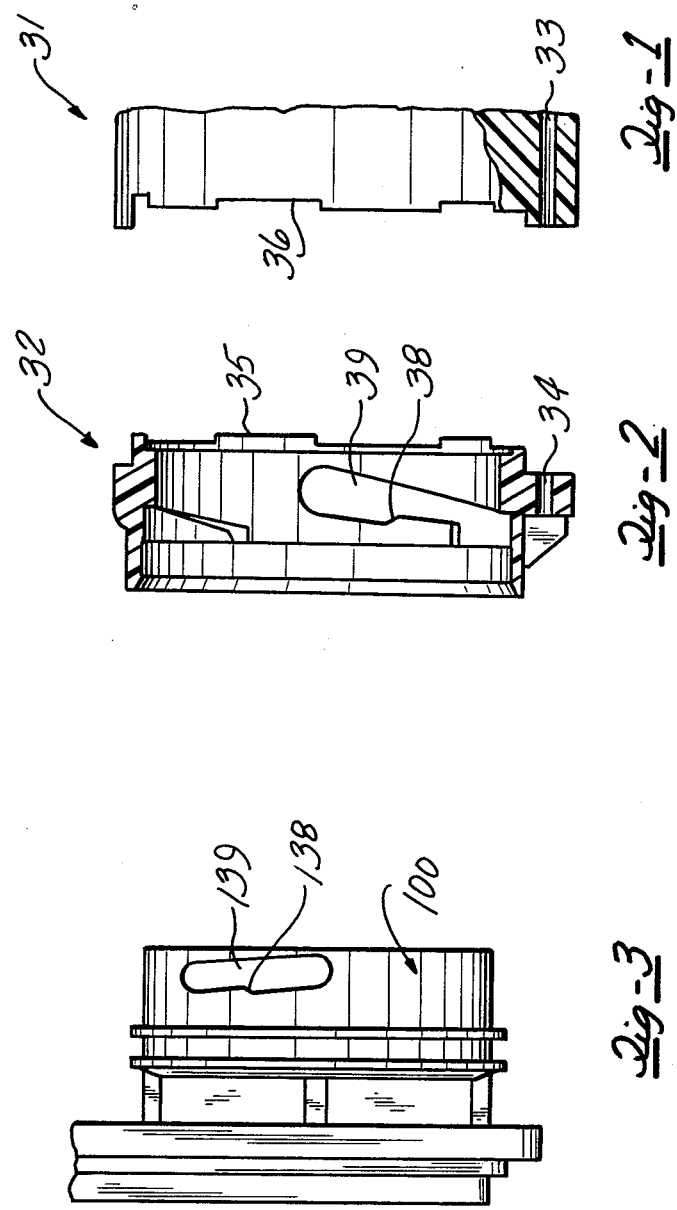

FORWARDLY REMOVABLE COUPLING RING FOR AN ELECTRICAL CONNECTOR

This invention relates to an electrical connector and more particularly to a coupling ring for the connector.

An electrical connector assembly is generally comprised of two separate housings connected together by a coupling member mounted on one of the housings. In cylindrically shaped connectors there are bayonet type couplings, which include an internal groove that mates with a pin on a housing, and threaded couplings which include threads that mate with threads on a housing so that when the coupling member is rotated the housings are drawn together mating the contacts within the housing. Both types of coupling members are generally mounted behind an annular flange on one of the housings and held in place by a snap ring. Because of this arrangement when a problem arises with a coupling ring and it must be removed and replaced it is necessary to remove the wires and attached contacts within the connector assembly to remove the coupling ring.

Accordingly, removal and replacement of a coupling ring from a connector assembly is time consuming and undesirable because improper replacement of the contacts may easily occur.

DISCLOSURE OF THE INVENTION

This invention is an electrical connector that has a forwardly removable coupling ring. The coupling ring is characterized by two annular members that are connected together by one or more removable fasteners and held in place in front of the annular flange on the connector housing by a snap ring that is snapped into a groove in front of the housing. One of the coupling ring members includes a lever to facilitate rotation of the coupling ring.

Accordingly, it is an advantage of this invention to provide an electrical connector with a forwardly removable coupling ring.

It is another advantage of this invention to provide a coupling ring that may be removed from an electrical connector housing without the necessity of removing contacts and the wires attached to the contacts.

DETAILED DESCRIPTION OF THE INVENTION

FIGS. 1 and 2 illustrates a portion of a coupling ring for an electrical connector that forms a part of this invention.

FIG. 3 illustrates an electrical connector housing adapted to receive a coupling ring.

Figure 4:
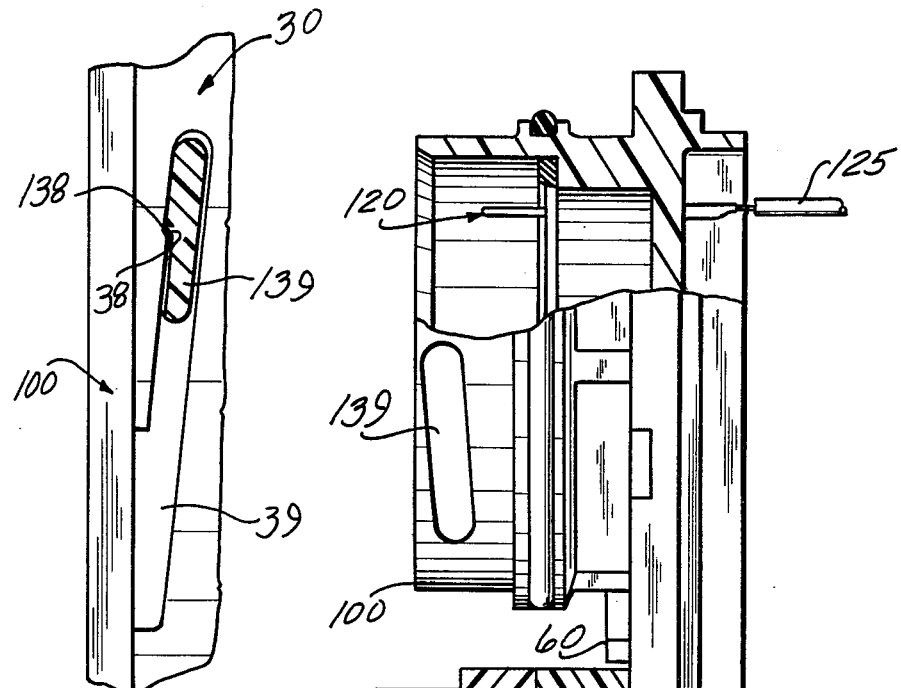
FIG. 4 is an enlarged view of a coupling ring and connector housing connected together.

Referring now to the drawings, FIG. 1 illustrates a portion of a first annular member 31 that forms a portion of the coupling ring. The first annular member 31 has a plurality of detents 36 and a passage 33 adapted to receive a fastener for connecting together the first member 31 and second member 32 shown in FIG. 2.

FIG. 2 illustrates the second annular member 32 of the coupling ring. The second annular member 32 includes an annular groove 39 extending a predetermined distance on the inside thereof and adapted to receive a projection on another connector housing; a plurality of axial projections 35 adapted to mate with the detents 36 in the first member 31 shown in FIG. 1 to prevent relative movement between the first and second members when they are connected together; and a passage 34 adapted to receive a removably mounted fastener that connects the first and second members together. The forward surface of the groove 39 includes a shoulder 38.

FIG. 3 illustrates an electrical connector housing 100 adapted to mate with the second member 32 of the coupling ring. The housing includes an elongated projection 139 that mates with the groove 39 in the second member 32 of the coupling ring. The elongated projection 139 includes a shoulder 138 adapted to abut against the shoulder 38 shown in the groove 39 of the second member 32 in FIG. 2. When the projection 139 is aligned with the groove 39 in the second member 32 showin in FIG. 2 and the member 32 is rotated the housing 100 and member 32 are drawn together.

FIG. 4 shows the projection 139 after it has traveled through the groove 39 from the lower end up to the top portion where the shoulders 138, 38 abut against each other, holding the coupling ring 30 on the housing 100.

Figure 5:
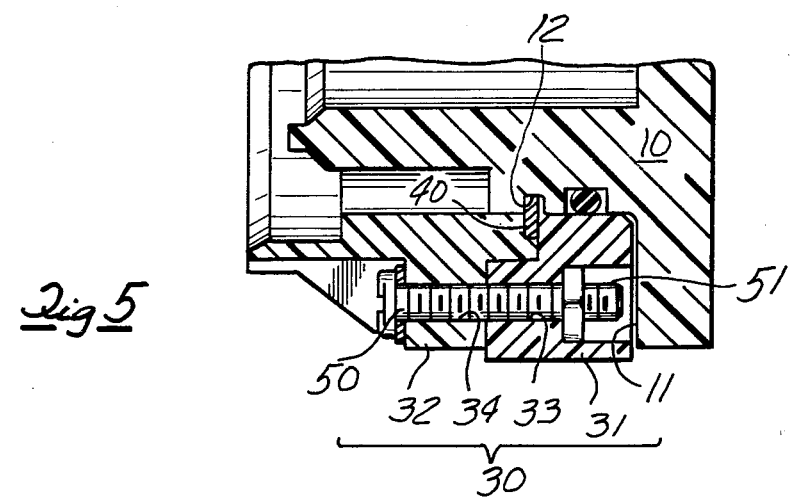
FIG. 5 is an enlarged view of a portion of a coupling ring incorporating the principles of this invention.

FIG. 5 illustrates how the coupling ring incorporating the principles of this invention is mounted forwardly of the annular shoulder 11 of a connector housing 10. The first annular member 31 is connected to the second annular member 32 by a nut 51 and a bolt 50, which is located through the passages 33, 34 in the first and second members 31 and 32. To assemble the coupling ring 30 on the housing 10 the first member 31 is located against the annular shoulder 11 of the housing 10. A snap ring 40 is then placed in groove 12 to retain the first member 31 between the snap ring 40 and the shoulder 11. The second annular member 32 is then placed against the first member 31 and bolt 50 is placed through the passages 33, 34 in the first and second members 31, 32 and into nut 51. When the bolt 50 is tightened the first and second members 31, 32 are removably retained together.

Figure 6:
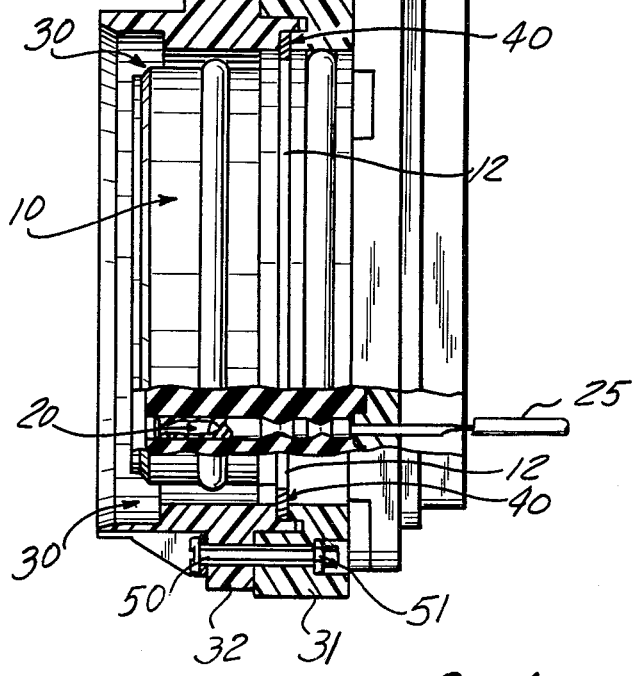
FIG. 6 is a side view of an electrical connector assembly incorporating the principles of this invention.

FIG. 6 shows an electrical connector assembly incorporating the principles of this invention. In this embodiment a housing 10 having the coupling nut 30 mounted thereon is mounted below a housing 100 adapted to receive a coupling nut. Both housings 10 and 100 include a plurality of electrical contacts 20, 120 that are mounted within the connector housings 10, 100 and attached to wires 25, 125.

Figure 7:
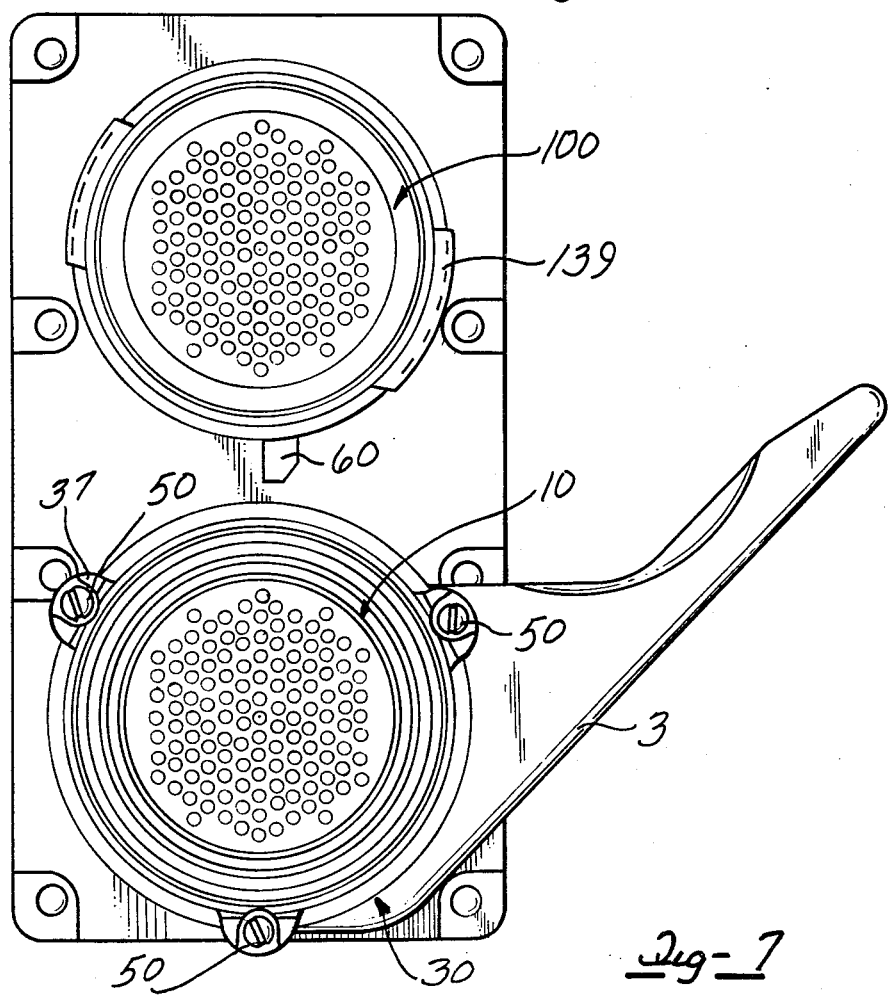
FIG. 7 is a front view of the connector assembly shown at FIG. 6.

FIG. 7 illustrates a front view of the connector assembly shown in FIG. 6. In this embodiment of the invention the first member 31 of the coupling ring 30 includes a lever 3 which is used to rotate the coupling ring. Projection 60 on the other housing 100 and projection 37 limits the movement of the lever 3 and prepositions the lever 3 for the initial mating with a complementary connector assembly.

While a preferred embodiment of the invention has been disclosed, it will be apparent to those skilled in the art that changes may be made to the invention as set forth in the appended claims and, in some instances, certain features of the invention may be used to advantage without corresponding use of other features. For instance, although only one bolt 50 is described as holding the first and second members 31, 32 together, more than one bolt may be used. Further, the passages 33 and 34 in the members 31 and 32 may be threaded so that the need for a nut 51 would be eliminated. Accordingly, it is intended that the illustrative and descriptive materials herein be used to limit the principles of the invention and not to limit the scope thereof.

Having described the invention what is claimed is:

1. In combination with an electrical connector of the type having: a tubular housing having a central axis, a forward portion and a radially projecting annular shoulder; at least one electrical contact mounted in said housing; a tubular coupling member disposed around a portion of said housing, said coupling member having a forward portion adapted to connect to another housing having contacts adapted to mate with the contacts in said tubular housing; and means for rotatably mounting the coupling member to said housing, the improvement wherein said coupling member and said means for rotatably mounting said coupling member comprises:

a groove in the forward portion of a housing;
   a first annular member located between the groove and annular shoulder of said housing;
   a snap ring in the groove in said housing to retain said first member on said housing forward of said shoulder;
   a second annular member; and
   means for removably connecting said first and second members together whereby said coupling member is rotatably mounted forwardly of said housing shoulder.

2. The electrical connector combination as recited in claim 1 wherein the means for removably connecting said first and second members together includes a passage through said first and second member, said passages axially aligned; and a third member, removably mounted in said aligned passage whereby, when said third member is removed from said passages the first and second annular members and said snap ring may be removed from the forward portion of said connector housing.

3. The electrical connector as recited in claim 2 wherein the third memeber is a threaded bolt adapted to mate with a nut in the passage in said first member.

4. The electrical connector combination recited in claims 1, 2 or 3 wherein said first annular member includes a radially extending lever.

5. The electrical connector combination as recited in claims 1, 2 or 3 wherein said second annular member includes on the inside thereof at least one radially extending groove adapted to receive a respective projection on another housing whereby rotational movement of said coupling member by said lever causes the projection in the other housing to travel in the annular groove drawing the housings together and the contacts therein into a fully mated position.

6. The electrical connector combination as recited in claim 5 wherein the second annular member includes a plurality of grooves each adapted to receive a respective projection on a similar housing.

7. The electrical connector combination as recited in claim 4 including means for locating the radially extending lever into a predetermined position.

8. The electrical connector as recited in claim 5 wherein said projection on said other housing and said groove in said coupling ring each include a shoulder adapted to mate with each other whereby said housing and coupling ring are held together when said shoulders mate.

9. The electrical connector as recited in claim 5 wherein said first annular member includes a radially extending lever.

10. The electrical connector as recited in claim 8 wherein said first annular member includes a radially extending lever.

* * * * *